Aug. 15, 1967   J. A. SUTTON ET AL   3,336,161

BIOCHEMICAL METHOD OF PRODUCING ELECTRICITY

Filed March 11, 1963

INVENTORS
JOSEPH A. SUTTON
JOHN D. CORRICK

BY Ernest S. Cohen
William S. Brown

ATTORNEYS

United States Patent Office 3,336,161
Patented Aug. 15, 1967

3,336,161
BIOCHEMICAL METHOD OF PRODUCING
ELECTRICITY
Joseph A. Sutton and John D. Corrick, Rockville, Md.,
assignors to the United States of America as represented
by the Secretary of the Interior
Filed Mar. 11, 1963, Ser. No. 264,743
14 Claims. (Cl. 136—86)

The invention herein described and claimed may be manufactured and used by or for the Government of the United States of America for governmental purposes without the payment of royalties thereon or therefor.

This invention relates to the direct conversion of chemical energy to electrical energy by means of an electrolytic cell.

Electrolytic cells for direct conversion of chemical energy to electrical energy have long been of interest since they are potentially highly efficient. Furthermore, such cells are useful in industrial and scientific applications such as space programs, where simplicity and compactness as well as efficiency are essential.

It has now been found that the chemical energy of inorganic materials may be simply and efficiently converted to electrical energy by means of an electrolytic cell in which microorganisms are used to catalyze the cell reaction. More particularly, it has been found that the chemical energy from oxidation of oxidizable iron salts may be converted to electrical energy by means of such a cell. Such a cell may also be utilized to measure the activity of the microorganism in catalyzing the electrolytic process thus providing a means of measuring such biological reactions as generation time; carbon dioxide, nitrogen and oxygen fixation efficiencies; etc.

Figure 1:
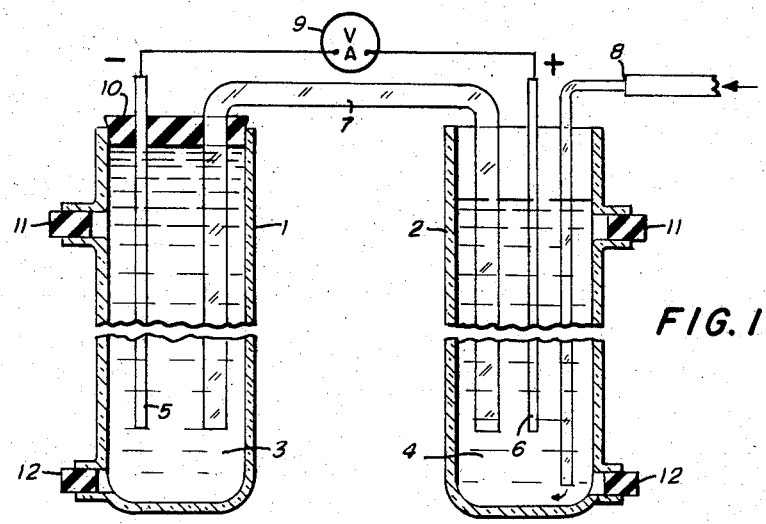
FIG. 1 is a diagram of one embodiment of the electrolytic cell of the invention.

The invention will be best described by reference to FIG. 1. Two vessels or housings 1 and 2, which serve as the two half cells, contain the electrolyte solutions 3 and 4 and electrodes 5 and 6, and are connected by means of KCl-agar electrolyte bridge 7. Since current flow in the external circuit is from half cell 1 to half cell 2, electrode 5 is designated the negative electrode or anode and electrode 6 the positive electrode or cathode according to the external electron flow convention. Half cell 1 contains a reductant material; half cell 2 contains an oxidant, the microorganisms and nutrient materials for the microorganisms. External electron flow is measured by meter 9. Half cell 2 is also fitted with an aerator, tube 8, for supplying compressed air which serves as the oxidant while half cell 1 is fitted with a stopper 10 for exclusion of atmospheric oxygen. Ports 11 and 12 may be used for supplying reactants and nutrients, if necessary, and removal of waste materials in adapting the cell for continuous operation.

The reaction occurring at anode 5 is one of oxidation while reduction occurs at cathode 6. These reactions result in flow of electrons through the external circuit and meter 9. Simultaneously, the internal circuit is completed by diffusion of ions through the electrolyte solutions and ion diffusion bridge 7.

A specific embodiment of the invention is illustrated by the following example.

Example 1

The two half cells consisted of 200 ml. test tubes employing graphite electrodes. A solution having the following composition

| | | |
|---|---|---|
| $FeSO_4 \cdot 7H_2O$ | g | 70 |
| $(NH_4)_2SO_4$ | g | 3 |
| KCl | g | 0.1 |
| $K_2HPO_4$ | g | 0.5 |
| $MgSO_4 \cdot 7H_2O$ | g | 0.5 |
| $Ca(NO_3)_2$ | g | 0.01 |
| Sulfuric acid, 10 N | ml | 0.1 |
| Distilled water | ml | 700 | was adjusted to a pH of 1.9 with concentrated sulfuric acid. Half cell 1 was then filled with this solution and sealed with rubber stopper 10 (FIG. 1) so as to exclude atmospheric oxygen.

Half cell 2 was ⅘ filled with the same solution as that employed in half cell 1 with the exception that the $FeSO_4 \cdot 7H_2O$ was omitted. This solution was inoculated with one milliliter of a *Ferrobacillus ferrooxidans* resting cell suspension (a suspension of microorganisms which has had all nutrients and energy sources removed) containing 264 micrograms of cell nitrogen per milliliter. Compressed air was passed through the aerator and bubbled into the solution in half cell 2. Bridge 7 connecting the cells consisted of a 1% agar-saturated KCl gel. The inorganic salts other than $FeSO_4 \cdot 7H_2O$ serve as nutrient materials to sustain cell metabolism; they may vary widely as to type of compound and proportions and are not essential to operation of the cell as will be shown in examples below.

The flow of current through meter 9 was observed and recorded. A parallel experiment was also run in which the solution in half cell 2 was not inoculated with microorganisms, these current measurements were also recorded. The results are shown in the following table.

TABLE 1

| | Electric cell readings | | | |
|---|---|---|---|---|
| Time, hours | Uninoculated | | Inoculated | |
| | Volt [1] | Micro-amperes [2] | Volt [1] | Micro-amperes [2] |
| 0.00 | | 1.5 | | [3] 0.0 |
| .25 | | 1.0 | | 4.5 |
| 1.42 | .01 | 0.2 | 0.05 | 6.0 |
| 4.42 | | 0.0 | | 14.0 |
| 15.08 | | 0.0 | | 10.0 |
| 17.08 | | 0.0 | | 9.3 |

[1] The readings were taken with a voltmeter having 0.5 volt full scale and internal resistance of 20,000 ohms/volt.
[2] The readings were taken with a micro mmeter with a resistance of 2,172 ohms.
[3] The contents of half cell 2 were inoculated with the bacterium after this reading.

It will be seen that the inoculated cell showed a significant increase in the quantity of current produced and a 5-fold increase in the voltage over that of the uninoculated cell.

The reactions taking place in the cell described in the above example may be represented as follows:

At the anode the ferrous sulfate is oxidized according to the following reaction:

$$2FeSO_4 + H_2SO_4 \rightarrow Fe_2(SO_4)_3 + 2H^+ + 2e$$

At the cathode the oxygen is reduced under the catalytic influence of the microorganisms according to the following equations:

*F. ferrooxidans*

$$\tfrac{1}{2}O_2 + 2H^+ + 2e \rightarrow H_2O$$

The hydrogen ions formed in the anode reaction migrate to the electrolyte solution of half cell 2 via diffusion bridge 7, while the electrons flow from the anode half cell to the cathode half cell via the electrodes and connecting wire.

Though the agar-KCl bridge employed in the above example has been found to be very satisfactory, other types of ion-diffusion media may be preferred for different cell arrangements and different reactants. The essential requirement of such media is that it permit ready diffusion of ions while preventing the materials at the anode and cathode, respectively, from mixing with each other.

Other types of cells may be used in place of the cell described in the preceding example; in these cells the agar-KCl medium is replaced by a permeable membrane. A specific embodiment of such a cell is described in the following example:

Example 2

Figure 2:
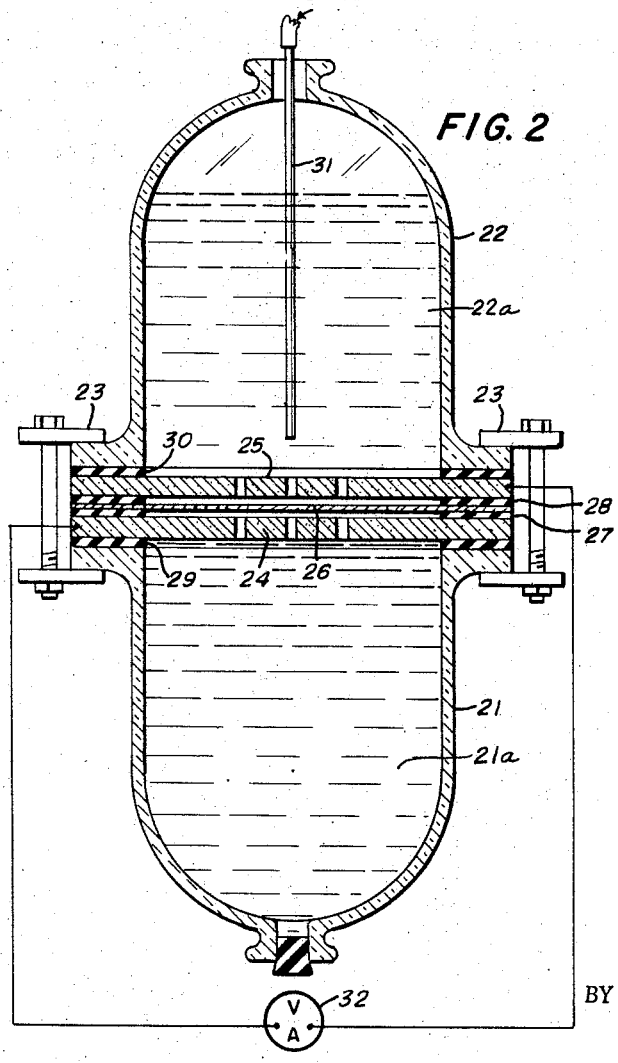
FIG. 2 is a diagram of a second embodiment of the electrolytic cell of the invention.

FIG. 2 illustrates the apparatus employed in this example. Glass half cell compartments 21 and 22, containing electrolyte solutions 21a and 22a, were clamped together by means of clamps 23. The electrodes were flat perforated carbon disks 24 (anode) and 25 (cathode). The two electrodes and corresponding half cells were separated by a 3-inch diameter, 0.0043 inch thick cellulose membrane 26 and rubber gaskets 27 and 28. Similar rubber gaskets 29 and 30 are used between compartments 21 and 22 and electrodes 24 and 25 respectively. Tube 31 supplies compressed air as the oxidant and current and voltage are measured by meter 32. The quantity of the reductant, $FeSO_4 \cdot 7H_2O$, was 35 grams instead of 70 as in Example 1, the solutions in the two half cells being otherwise the same as those in Example 1. The *F. ferrooxidans* inoculum was 4 milliliters of a resting cell suspension containing 128 micrograms of cell nitrogen per milliliter.

This system was even more effective in generating electricity than the cell of Example 1; the results are given in Table 2.

TABLE 2

| Time, hours | Electric cell readings | | | |
|---|---|---|---|---|
| | Uninoculated | | Inoculated | |
| | Volt [1] | Micro-amperes [2] | Volt [1] | Micro-amperes [2] |
| 0.0 | 0.00 | 8 | 0.01 | [3] 60 |
| 0.5 | .01 | 8 | .05 | 450 |
| 1.0 | .01 | 8 | .08 | 710 |
| 2.0 | .01 | 8 | .09 | 740 |
| 3.0 | .01 | 8 | .09 | 740 |
| 4.0 | .01 | 8 | .09 | 770 |
| 14.5 | .01 | 4 | .06 | 4,000 |
| 15.5 | .01 | 1 | .07 | [4] 3,000 |
| 19.25 | .01 | 1 | .07 | [4] 3,000 |

[1] The readings were taken with a voltmeter having 0.5 volt full scale and internal resistance of 20,000 ohms/volt.
[2] The readings were taken with a microammeter with a resistance of 2,172 ohms.
[3] The contents of half cell 22 were inoculated with the bacterium after this reading.
[4] The readings were taken with a microammeter with a resistance of 1 ohm.

Example 3

In this example a cell similar to that of Example 1 was used, with the exceptions that the anode half cell was filled with a 10-percent solution of ferrous sulfate (70 grams of $FeSO_4 \cdot 7H_2O$ per 700 milliliters of distilled water) which had been adjusted to a pH of 1.8 with concentrated sulfuric acid, while the cathode half cell was ⅕ filled with distilled water which had been adjusted to a pH of 1.8 with concentrated sulfuric acid. Two such cells were used to obtain the results given in Table 3.

TABLE 3

| Time, hours | Electric cell readings | | | |
|---|---|---|---|---|
| | Uninoculated | | Inoculated | |
| | Volt [1] | Micro-amperes [2] | Volt [1] | Micro-amperes [2] |
| 0.00 | [3] 0.00 | [3] 0.0 | [4] 0.00 | [4] 0.0 |
| 0.17 | [3] 0.00 | [5] 0.0 | 0.01 | 5.0 |
| 1.17 | [3] 0.00 | [3] 0.0 | 0.02 | 9.0 |
| 3.17 | [3] 0.00 | [3] 0.0 | 0.02 | 10.0 |
| 4.17 | [3] 0.00 | [3] 0.0 | 0.02 | 10.0 |
| 5.17 | [5] | [3] 0.0 | [5] | 10.0 |
| 6.41 | [5] | [3] 0.0 | [5] | 9.5 |

[1] The readings were taken with a voltmeter having 0.5 volt full scale and an internal resistance of 20,000 ohms/volt.
[2] The readings were taken with a microammeter having 50 microamperes full scale and an internal resistance of 1,500 ohms.
[3] Five milliliters of distilled water adjusted to a pH of 3.5 with sulfuric acid were added after this reading.
[4] Five milliliters of a resting cell suspension of *Ferrobacillus ferrooxidans* were added after this reading.
[5] Not determined.

It will be seen that the organisms were able to generate electricity from a solution devoid of nutrients.

Example 4

In this example a cell similar to that of Example 3 was used, except that the bacterium, *Thiobacillus ferrooxidans*, was substituted for *F. ferrooxidans*. Results, shown in Table 4, indicate that this organism is also effective in generating electricity. The table also shows that an increase in concentration of the organisms resulted in an increase in current.

TABLE 4

| Time, hours | Electric cell readings | |
|---|---|---|
| | Volts [1] | Microamperes [2] |
| 0.00 | [3] 0.00 | [3] 0.0 |
| 0.05 | 0.01 | 3.0 |
| 0.83 | 0.02 | 7.0 |
| 1.36 | 0.02 | 10.0 |
| 1.93 | 0.02 | 10.0 |
| 2.83 | 0.02 | 10.0 |
| 3.36 | 0.02 | 10.0 |
| 4.33 | [4] 0.02 | [4] 15.0 |

[1] The readings were taken with a voltmeter having 0.5 volt full scale and an internal resistance of 20,000 ohms/volt.
[2] The readings were taken with a microammeter having 50 microamperes full scale and an internal resistance of 1,500 ohms.
[3] Inoculated with 10 milliliters of a resting cell suspension of *Thiobacillus ferrooxidans* immediately after the reading.
[4] An additional 5 milliliters of *Thiobacillus ferrooxidans* were added before this reading was taken.

Example 5

The effect of dead (heat killed) bacteria and the location (anode vs cathode half cell) of viable bacteria on the generation of electrical energy is illustrated in this example. Other than using dead bacteria and placing viable bacteria in the anode half cell this cell was the same as that employed in Example 3. Results, given in Table 5, indicate that the bacteria must be placed with the oxidant before significant electrical energy can be generated and that heat killing the bacteria also destroys the mechanism involved in generating this energy.

TABLE 5

| Test No. | Conditions of test | Electrical measurements after 4 hours operation at 1×10⁴ ohms [1] | |
|---|---|---|---|
| | | Millivolts | Microamperes |
| 1 | Bacteria with oxidant | 158 | 159 |
| 2 | Heat-killed bacteria with oxidant. | [2] N.D. | 6 |
| 3 | Bacteria with reductant | 6 | 7 |
| 4 | No bacteria (control) | 2 | 2 |

[1] Electrical measurements were made on a Universal K-3 Potentiometer (Leeds and Northrup).
[2] N.D. denotes not detected.

The invention is not limited to the particular organisms of the examples—any organism which will catalyze the reduction of the oxidant in acid medium may be employed.

Other types of electrodes such as platinum wire and foil as well as monel wire may be employed. Any good electrical conductor which will withstand dilute acid solutions may be used. Other examples are gold, silver and platinized carbon.

Other electrolytes which may be employed in the dilute acid electrolyte solution are sodium chloride, potassium chloride, ammonium sulfate, potassium dihydrogen phosphate and magnesium sulfate.

Reductants other than ferrous sulfate may be used; examples are ferrous chloride, ferrous nitrate and ferrous ammonium sulfate.

Oxidants other than air which may be employed are oxygen and hydrogen peroxide.

The specific pH of the electrolyte solution of the examples, 1.9, is not critical; however, the pH must be sufficiently low to prevent precipitation of iron. A pH of about 2 or less is usually sufficient to prevent precipitation. On the other hand, too low a pH (much below about 1.5) may be detrimental to the bacteria.

Exclusion of atmospheric oxygen from the anode section may be achieved by means other than the rubber stopper of the examples, as for example, other solid materials, an immiscible liquid such as mineral oil on the surface of the electrolyte solution, an inert gas above the electrolyte solution, etc.

What is claimed is:
1. A method for producing electrical energy in a biochemical cell having an ion-diffusion medium between half cells, said half cells having electrodes inert to electrolyte, comprising:
   (a) employing as electrolyte in one of said half cells a sulfuric acid solution having a pH above about 1.5 and including an oxidant and a bacterial culture capable of catalyzing reduction of said oxidant in an acid medium, said oxidant selected from the group consisting of an oxygen-containing gas and hydrogen peroxide, said culture selected from the group consisting of *Ferrobacillus ferrooxidans* and *Thiobacillus ferrooxidans;*
   (b) employing as electrolyte in the other of said half cells a sulfuric acid solution having a pH above about 1.5 and including an oxidizable ferrous salt selected from the group consisting of ferrous sulfate, ferrous chloride, ferrous nitrate, and ferrous ammonium sulfate; and
   (c) excluding atmospheric oxygen from said other of said half cells.

2. The process of claim 1 in which the electrodes are carbon.

3. The process of claim 1 in which the ferrous salt is ferrous sulfate.

4. The process of claim 1 in which said oxidant is air.

5. The process of claim 1 in which the bacteria are *Ferrobacillus ferrooxidans.*

6. The process of claim 1 in which the bacteria are *Thiobacillus ferrooxidans.*

7. The process of claim 1 in which said ion-diffusion medium comprises an agar-KCl bridge.

8. The process of claim 1 in which said ion-diffusion medium comprises an ion-diffusion membrane.

9. The process of claim 1 in which the pH of the electrolyte solution is about 1.9.

10. The process of claim 4 in which compressed air is bubbled into the solution in said one of said half cells.

11. The process of claim 5 in which the bacterial culture comprises about 1 ml. of a cell suspension containing about 264 micrograms of cell nitrogen per milliliter.

12. The process of claim 5 in which the bacterial culture comprises about 4 ml. of cell suspension containing about 128 micrograms of cell nitrogen per milliliter.

13. The process of claim 8 in which the ion-diffusion membrane is about 0.0043 inch-thick cellulose membrane.

14. The process of claim 13 in which the electrodes are flat perforated carbon disks.

References Cited

UNITED STATES PATENTS

| 2,901,522 | 8/1954 | Bopp | 136—86 |
| 2,913,511 | 11/1959 | Grubb | 136—86 |

WINSTON A. DOUGLAS, *Primary Examiner.*

H. FEELEY, *Assistant Examiner.*